United States Patent [19]
Cole

[11] 3,987,983
[45] Oct. 26, 1976

[54] TRAILING EDGE FLAPS HAVING SPANWISE AERODYNAMIC SLOT OPENING AND CLOSING MECHANISM

[75] Inventor: James B. Cole, Mercer Island, Wash.

[73] Assignee: The Boeing Company, Seattle, Wash.

[22] Filed: Dec. 20, 1974

[21] Appl. No.: 534,828

[52] U.S. Cl. ............................ 244/42 DB; 244/44
[51] Int. Cl.² ........................................ B64C 9/20
[58] Field of Search ........ 244/42 D, 42 DA, 42 DB, 244/44

[56] References Cited
UNITED STATES PATENTS

| | | | |
|---|---|---|---|
| 2,444,293 | 6/1948 | Holt | 244/42 DB |
| 3,583,660 | 6/1971 | Hurkamp et al. | 244/42 DA |

FOREIGN PATENTS OR APPLICATIONS

| | | | |
|---|---|---|---|
| 901,633 | 8/1945 | France | 244/42 DB |
| 486,823 | 6/1938 | United Kingdom | 244/42 DB |

*Primary Examiner*—Trygve M. Blix
*Assistant Examiner*—Barry L. Kelmachter
*Attorney, Agent, or Firm*—Christensen, O'Connor, Garrison & Havelka

[57] ABSTRACT

An aircraft wing for use in a STOL aircraft incorporating upper surface blowing engines employs trailing edge flaps, including a main flap segment and an aft flap segment. The flaps are mounted on and externally hinged below the wing for movement between a retracted position and a plurality of extended positions. The main flap segment is hinged to its support for pivotal movement about a spanwise axis. The main flap segment is in a first position when retracted and normally remains in that position as the flaps are extended. When the flaps are extended and the main flap segment is in the first position, the upper airfoil surfaces of main flap segment and the aft flap segment form a smooth, continuous upper surface that extends downwardly and rearwardly from the upper airfoil surface of the wing. When the flaps are extended, the main flap segment can be pivoted about the spanwise axis to a second position to form spanwise slots between the forward portion of the main segment and the aft portion of the wing and between the aft portion of the main segment and the forward portion of the aft segment. In the first position, wherein the smooth, continuous, downwardly and rearwardly extending upper airfoil surface is formed, the trailing edge flap system can be employed with an upper surface blowing engine to take advantage of the Coanda effect to turn the exhaust stream issuing rearwardly and chordwise across the wing to turn the exhaust stream downwardly and rearwardly, thereby creating an upwardly directed, engine-generated lift component to augment the aerodynamic lift generated by the wing and flap structure. In the second position, the spanwise slots function to enhance the aerodynamic lift generated by the wing/flap combination as it moves through the air by allowing ambient air to flow through the slots.

12 Claims, 7 Drawing Figures

TRAILING EDGE FLAPS HAVING SPANWISE AERODYNAMIC SLOT OPENING AND CLOSING MECHANISM

BACKGROUND OF THE INVENTION

This invention relates to a wing and trailing edge flap structure for short takeoff and landing (STOL) aircraft, and more particularly, to a trailing edge flap system that creates a smooth downward and rearward extension of the upper airfoil surface upon extension and that, when extended, can be altered in flight to create spanwise aerodynamic slots in the flap system to enhance aerodynamic lift.

Several applications are related to the subject matter disclosed herein. They include Lewis et al, Ser. No. 339,734, filed Mar. 9, 1973, now abandoned and refiled as a continuing, copending application, Ser. No. 520,674, filed Nov. 4, 1974, and Cole et al, Ser. No. 339,645, filed Mar. 9, 1973, now U.S. Pat. No. 3,837,601, all of which are expressly incorporated herein by reference.

The present invention has particular application in STOL aircraft using upper surface blowing. The engines of an aircraft employing upper surface blowing are mounted forwardly and above the wings to discharge their exhaust stream chordwise across the upper airfoil surface of the wing. During normal flight, the exhaust stream is directed rearwardly to generate forward thrust in a conventional manner. Upon landing and takeoff, trailing edge flaps are employed with such aircraft to increase the camber and chord of the wing and at the same time to form a continuously curved, downward and rearward extension of the upper airfoil surface of the wing. When the trailing edge flaps are so extended, the exhaust stream traveling chordwise over the upper airfoil surface of the wing attaches itself by the Coanda effect to the downwardly and rearwardly curved surface to divert the exhaust stream downwardly and rearwardly. In this manner, a lift component, as well as a forward thrust component, is generated by the exhaust stream. The engine-generated lift component augments the conventional aerodynamic lift created by ambient air flow over the remaining portion of the wing to provide a STOL capability.

As disclosed in the aforementioned copending applications, a serious problem is encountered when engine failure occurs during landing or takeoff. When an engine fails, the engine-generated lift is lost, as well as the forward thrust component otherwise derived from the inoperative engine. When this occurs, a substantial portion of the total lift acting on the aircraft is lost, creating an emergency situation. In addition the extended flaps create a substantial amount of drag, further reducing the net forward thrust acting on the aircraft. Flap systems for partially alleviating the emergency situation by restoring some aerodynamic lift are disclosed in the aforementioned applications. These flap systems generally comprise apparatus for rearranging the flap structure to eliminate the smooth, continuous upper airfoil surface, and at the same time, forming spanwise slots in the flap system. These slots allow the extended trailing edge flaps to function as conventional slotted flaps similar to those used on many commercial aircraft today.

The flap systems disclosed in the aforementioned applications solve the problem by arranging the flap segments to normally form a slotted flap configuration when extended. Slot closure devices are then employed to cover the slots and to form a smooth, continuous, downwardly and rearwardly curved, upper airfoil surface. In one embodiment, the slot closure device is added to the flap system by positioning a flexible panel on the leading edge of each of the flap segments. An actuator is mounted on each of the segments to move the flexible panel between a position in which the slot is closed and a position in which the slot is opened. The addition of the slot closure devices makes the flap segment construction more complex and more expensive. In addition multiple actuators are required, not only on each segment, but because of structural limitations in the flexible panel at several locations along the span of the flexible panel.

A broad object of the present invention is to provide a trailing edge flap system that has the capability to normally function, when extended, as a continuous downward and rearward extension of the upper airfoil surface of the wing and, in addition, have the capability to function as a conventional slotted flap should an emergency such as an engine failure occur. More specifically, it is an object of the present invention to provide such a flap system that is less expensive to manufacture and that is less complex and simpler in design than the flap systems disclosed in the aforementioned applications and that requires minimum of operating mechanism to actuate. In this context it is another object of the invention to provide the foregoing attributes in an externally hinged flap system without employing separate slot closure or opening devices.

SUMMARY OF THE INVENTION

Accordingly, the foregoing objects, and other objects that will become apparent to one of ordinary skill in the art upon reading the following specification, are provided in an aerodynamic lift enhancing apparatus including a wing and a trailing edge flap system. The trailing edge flap system includes at least a main flap, and preferably a plurality of flaps that are mounted by support means for movement between a retracted position and a plurality of extended positions. The flaps are so oriented relative to the wing and their support means and are so shaped relative to the upper airfoil surface of the wing so as to, when extended, increase the camber and chord of the wing and at the same time form a continuous, downwardly and rearwardly curved extension of the upper airfoil surface of the wing. The main flap is mounted on its support means for swinging movement between first and second positions when the flap system is extended. The main flap is in the first position when retracted. When the main flap is extended in its first position, the aft portion of the upper airfoil surface of the wing and the trailing portion of the main flap are positioned adjacent and contacting the upper airfoil surfaces of the main flap and the next rearwardly adjacent flap, respectively, thereby forming a continuous downward and rearward extension of the upper airfoil surface of the wing. In the second position, the forward portion of the main flap is moved downwardly from its first position to form a spanwise slot between the aft portion of the wing and the forward portion of the main flap. At the same time, the aft portion of the main flap is moved upwardly relative to the next rearwardly adjacent flap to form a spanwise slot therebetween. An actuating means is provided for moving the main flap from the first position to the second position when the flap system is extended.

BRIEF DESCRIPTION OF THE DRAWINGS

A better understanding of the present invention can be derived by reading the ensuing specification in conjunction with the accompanying drawings wherein.

DESCRIPTION OF PREFERRED EMBODIMENT

Figure 1:
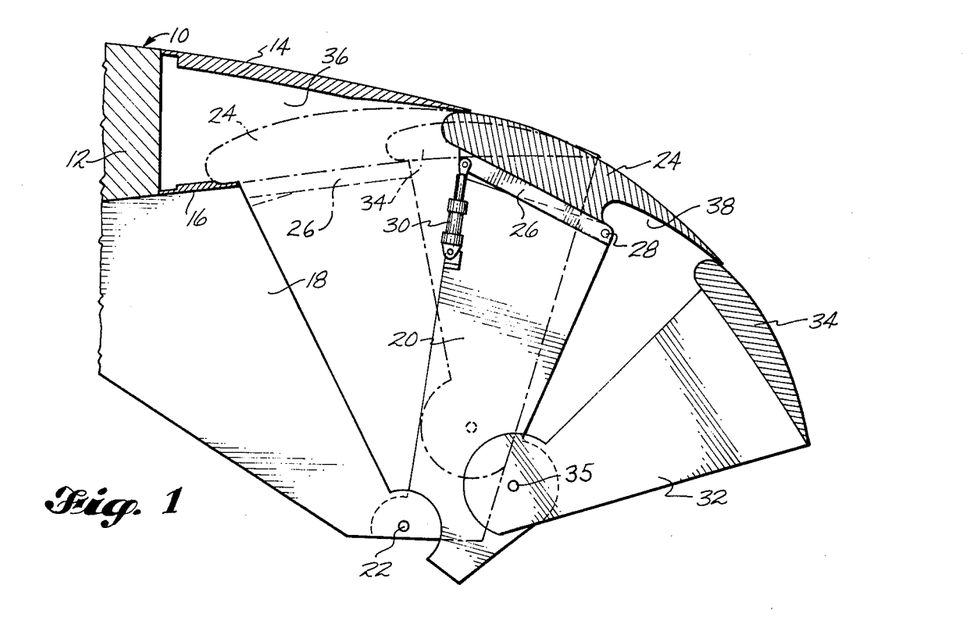
FIG. 1 is a simplified, somewhat schematic view in partial cross-section of the rear portion of a wing and a trailing edge flap system constructed according to the present invention showing the flap system in the extended, STOL configuration.

Referring to FIG. 1, the rear portion of a wing 10 includes a rear structural spar 12, an upper airfoil surface 14 and a lower surface 16. A trailing edge flap system, including a main flap segment 24 and an aft flap segment 34, of the externally hinged type is suitably mounted to the aft portion of the wing 10. Each of the flap segments has an upper surface of airfoil shape. Although a spanwise view of the structure is not illustrated, one of ordinary skill in the art realizes that the airfoil surfaces of the wing and the flap segments, as well as their supporting structure have a spanwise dimension. In the drawings, the spanwise dimension extends substantially perpendicularly to the plane of the view.

A flap mounting strut 18 is conventionally affixed to the lower, rearward portion of the wing 10 and extends downwardly and rearwardly from the lower surface 16 of the wing. A main flap segment support arm 20 extends upwardly from and is pivotally connected in a conventional manner to the bottom of the mounting strut 18 by a pin 22. The upper portion of the main support arm is mounted to swing fore and aft on the pin 22 about a generally spanwise axis. The main flap segment 24 is mounted on the upper portion of the upwardly extending main support arm 20. In this embodiment an external attachment flange 26 is affixed to the lower portion of the main flap segment 24 and extends from a position adjacent the leading edge of the main segment rearwardly to a position located at approximately 60% of the fore to aft dimension of the chord of the main segment. The rearward portion of the external flange 26 is pivotally mounted by pin 28 to the upper rearward portion of the main support arm 20 for up and down swinging movement about an axis oriented generally spanwise relative to the main flap segment. This mounting arrangement allows the main flap segment to swing about a spanwise axis so that as the forward portion of the main segment is swung downwardly, the aft portion of the segment is swung upwardly. Likewise, as the forward portion of the main segment is swung upwardly about the spanwise axis, the aft portion of the main segment is swung downwardly. A suitable actuator, in this embodiment a fluid cylinder and piston assembly (hydraulic or pneumatic), is suitably mounted to pivot the main flap segment 24 about its pivot pin 28. The piston arm of the fluid piston and cylinder assembly 30 is pivotally connected to the forward portion of the external flange 26. The cylinder portion of the assembly 30 is pivotally connected to the forward portion of the main support arm 20. The lower portion of an upwardly extending, aft flap segment support arm 32 is pivotally mounted for fore and aft swinging movement by pin 35 to the lower, rearward portion of the main support arm 20. The aft flap segment 34 is affixed in a conventional manner to the upper portion of the aft support arm 32. It is to be understood that two or more mounting assemblies, including a mounting strut and support arms, are located at spaced intervals along the span of the wing to support the flap segments for swinging movement at two or more locations.

When the flap system is moved to a retracted position (as shown in dot-dash outline in FIG. 1), the flap support arms are rotated about their respective pivot pins to a position forwardly of their extended position. The rearward portions of the upper and lower skins forming the upper airfoil surface 14 and lower surface 16 respectively of the trailing portion of the wings are so constructed as to provide a nesting recess 36 between the upper and lower skins at the aft portion of the wing. When the main segment 24 is moved to its forward, retracted position by pivoting the main support arm 20, the major portion of the main flap segment fits within this nesting recess 36. In a similar manner, the bottom rearward portion of the main flap segment 24 is so constructed to provide a nesting recess 38 to accommodate the aft flap segment in its forward, retracted position. When the aft flap segment is in its forward, retracted position, the major portion of the aft segments fits within this nesting recess 38. When the flap segments are retracted, the upper rearward surface of the main flap segment forms a rearward extension of the upper surface 14 of the wing 10 while the lower surface of the main flap segment 24 forms a rearward extension of the lower surface 16 of the wing 10. Likewise, the upper, rearward portion of the aft flap segment 34 and the lower surface of the aft flap segment form rearward extensions of the upper and lower surfaces of the main flap segment. The chord and camber of the wing in combination with retracted flaps are designed to provide a wing geometry suited to high speed flight.

As illustrated in solid outline in FIG. 1, the flap support arms are pivoted rearwardly about their respective mounting pins to swing the flap segments rearwardly and downwardly to an extended position. As shown, the flap segments are located at their position of maximum extension. The main flap segment 24 is oriented by appropriate energization of the actuator 30 so that its forward, upper portion is positioned adjacent the trailing portion of the upper airfoil surface 14 of the wing 10. The trailing portion of the upper surface of the main segment is positioned adjacent the forward, upper portion of the aft flap segment 34. The main flap segment is held in this first position by appropriate extension of the piston arm of the actuator 30. The aft portions of the upper surfaces of both the wing and the main segment are biased in a downwardly direction to assure that they bear against the respective upper surfaces of the main segment and aft segment, respectively. So biasing the aft portions of the upper surfaces of the wing and main segment can be accomplished by suitably stressing the internal structure that supports the upper surfaces. If desired, a seal can be interposed at the contact surfaces between the respective aft portions and upper flap surfaces.

When the main flap segment is so oriented, its upper airfoil surface and the upper airfoil surface of the aft flap segment 34 form a continuous, downward and rearward arcuate surface that is an extension of the upper airfoil surface of the wing 10. This continuous, downwardly and rearwardly curved surface provides maximum downward diversion of the exhaust stream from an upper surface blowing engine. The flap system need not be fully extended to operate in accordance with the present invention, but can be moved between a plurality of intermediate, extended positions. The trailing edges of both the upper surface of the wing and of the upper surfaces of the main flap segment and the aft flap segment are oriented in relation to the spanwise swing axes of the main and aft segments (formed by the pivot pins 22 and 35 that mount the main and aft support arms 20 and 32) so that the upper surfaces of the flap segments are always positioned adjacent the respective trailing edges of the upper surfaces of the wing and the main segment. In this manner, a smooth, continuous, downwardly and rearwardly curved upper surface is always maintained regardless of whether the flaps are fully extended or only partially extended. Also, the main flap segment is designed so that the flap system can be fully retracted without moving the main segment away from this first position. Thus for normal STOL operation the flap system can be extended and retracted without ever actuating the piston and cylinder assembly 30.

Figure 2:
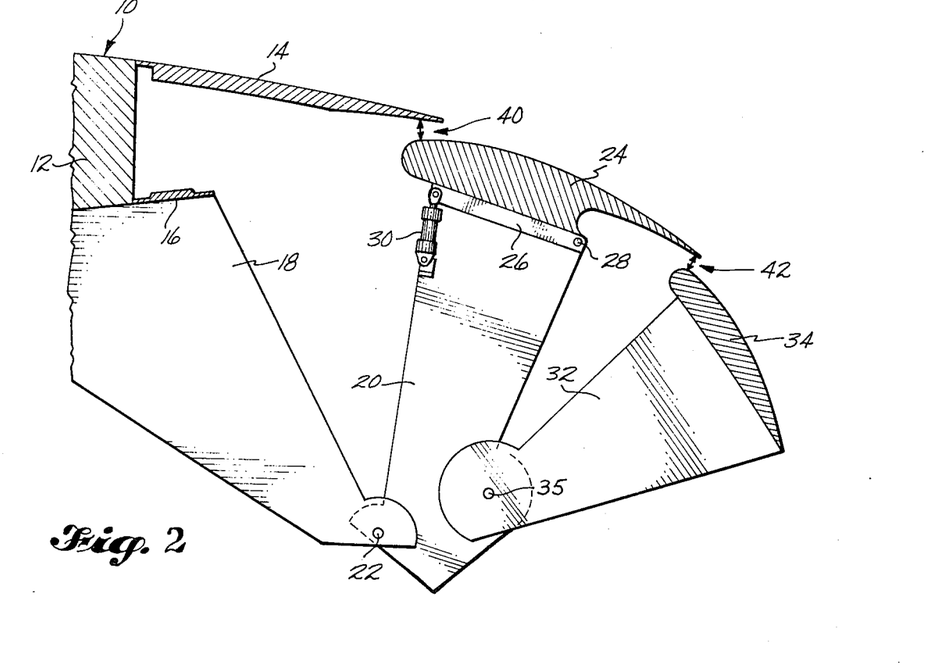
FIG. 2 is a view of the flap system of FIG. 1, showing the flap segments in the emergency, slotted configuration.

Referring now to FIG. 2, in which the flap system of FIG. 1 is shown in the configuration wherein spanwise, aerodynamic slots are formed between the rearward portion of the wing 10 and the forward portion of the main flap segment 24 and between the rearward portion of the main flap segment 24 and the aft segment 34. These aerodynamic slots, respectively numbered 40 and 42, allow ambient air, or air normally flowing past the undersurface of the wing due to the forward motion of the aircraft, to flow across the leading edges of the main flap segment 24 and the aft flap segment 34 and thereafter over the upper airfoil surfaces of the flap segments. This flow of ambient air will provide a layer of high energy air adjacent the upper flap surfaces to increase the aerodynamic lift not otherwise available from the wing and flap structure. The spanwise flap slots 40 and 42 are formed by simply rotating the main flap segment 24 about its generally spanwise pivotal axis formed by pivotal mounting pin 28. The main flap segment is pivoted about this point by causing the piston arm of the pneumatic cylinder 30 to retract thus pulling downwardly on the forward portion of the external attachment flange 26 on which the main flap segment 24 is mounted. In this manner the leading edge and forward portion of the main flap segment 24 are rotated downwardly to separate the upper forward portion of the main flap segment from the upper surface 14 of the wing 10. Because the flap segment 24 is a rigid unit, the upper rearward portion of the main flap segment 24 is simultaneously rotated upwardly and away from the forward portion of the aft flap segment 34.

The basic trailing edge flap structure for forming a continuous, downwardly and rearwardly curved airfoil surface for use in STOL operation with an upper surface blowing engine can be reconfigured during flight to form aerodynamic spanwise slots to enhance normal aerodynamic lift. The trailing edge flap structure of the present invention is simple and straightforward, requiring a single spanwise pivotal axis to swing the main flap segment from its first position, forming a continuous curved surface, to its second position, forming spanwise slots. Moreover, a single actuating mechanism is required to swing the entire main flap segment between its first and second positions. The structure required to so move the main flap segment in accordance with the present invention does not in any way interfere with the extension and retraction mechanism for the flap segments. It is superior to those systems shown in the prior art as it does not require multiple actuators, specially designed flap segments or flap skin structure or specially designed wing skin structure. No moving parts, other than a means for providing a spanwise, pivotal mounting for the main flap segment and an actuator for moving the main flap segment between its STOL and slotted flap positions, are required.

Figure 3:
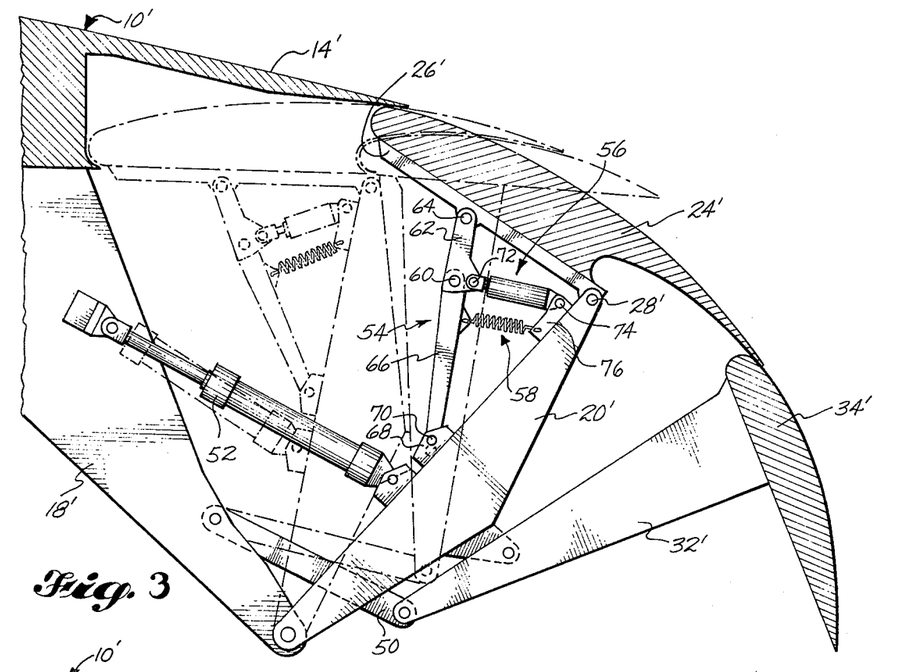
FIG. 3 is a simplified, somewhat schematic view in partial cross-section of a second preferred embodiment of the invention, showing the flap system in the extended, STOL configuration.

FIG. 3 illustrates a most preferred embodiment for actuating the flap system of the present invention. Although of somewhat different geometry, the flap extension and retraction structure of this embodiment is substantially the same as that of the previous embodiment. A downwardly and rearwardly extending flap mounting strut 18' is mounted on the lower rearward portion of the wing 10'. A main flap segment support arm 20' is pivotally mounted to the bottom portion of the mounting strut 18' and extends upwardly therefrom. Likewise, an aft flap segment support arm 32' is pivotally mounted to the main support arm 20'. One end of a secondary actuating link 50 is pivotally connected between the bottom portion of the aft support arm 32' below its pivotal connection to the main support arm 20'. The other end of the secondary link, which extends forwardly from its pivotal connection to the aft support arm 32', is pivotally connected to the lower portion of the aft flap mounting strut 18' above and somewhat forwardly of the pivotal connection of the main support arm 20' to the flap strut 18'. An extensible fluid actuator 52 (pneumatic or hydraulic) or other suitable actuating mechanism is mounted between the support strut 18' and the main segment support arm 20' above the latter's connection to the support strut 18'. Upon extension and retraction of the fluid actuator 52, the upper portion of the main support arm is swung fore and aft between its retracted and extended positions, respectively. As this occurs, the secondary link 50 simultaneously causes fore and aft swinging movement of the upper portion of the aft segment support arm 32' between its retracted and extended positions respectively.

The main flap segment 24' carries an external attachment flange 26', similar to that of the previous embodiment, that extends from the lower forward portion of the main flap segment 24' rearwardly to a location approximately 60 to 70% of the chord length of the main flap segment 24'. The external flange 26' is pivotally connected at its rearward end to the upper portion of the main segment support arm 20' by a pin 28', thus mounting the main flap segment 24' for up and down swinging movement about a generally spanwise axis.

In this embodiment, an actuating means differing from the actuating means of the previous embodiment, is employed to swing the main flap segment 24' between its continuous upper airfoil surface configuration and its slot forming configuration. The actuating mechanism generally comprises a toggle linkage, designated 54, a fluid operated actuator 56, and a biasing member or spring 58. The toggle linkage has upper and lower arms 62 and 66 pivotally connected to each other at their mutually adjacent ends. The mutual pivotal connection of the arms is provided through a conventional pin or bolt 60, oriented so that the mutual pivotal axis of the linkage extends spanwise relative to the main flap segment. The upper and lower arms 62 and 66 of the toggle linkage 54 generally extend upwardly and downwardly, respectively from the mutual pivotal connection. The upper end of the upper arm 62 of the toggle linkage 54 is pivotally connected to the central portion of the external flange 26' by a pin 64. The lower end of the lower arm 66 of the toggle linkage 54 is pivotally connected by a pin 70 to a flange 68 that extends forwardly from the central, forward portion of the main support arm 20'. The pivotal axes formed by the pins 60, 64 and 70 are mutually parallel. In this embodiment, the axially extensible actuator 56 is a fluid piston and cylinder assembly or other suitable actuating assembly.

The fluid actuator 56 extends generally fore and aft and has its piston arm pivotally connected by a pin 72 to the central portion of the toggle linkage, specifically to the lower portion of the upper arm 62 at a location rearwardly of the mutual pivotal connection. The cylinder portion of the actuator 56 is pivotally connected by a pin 74 to a flange 76 that extends generally forwardly from the upper forward portion of the main support arm 20'. One end of a biasing spring 58 is connected to the central portion of the toggle linkage 54, specifically to a flange extending rearwardly from the upper rearward portion of the lower arm 66. The spring 58 extends rearwardly from its connection to the toggle linkage 54 and is connected to the lower portion of the forwardly extending flange 76 to which the cylinder portion of the actuator 56 is attached.

When the piston arm of the actuator 56 is axially retracted, the toggle linkage is held in a generally upright position wherein the upper and lower arms are mutually aligned generally along a line between the upper and lower pivot pins 64 and 70 connecting the linkage to the main flap segment and main support arm respectively. When so aligned, the toggle linkage positions the main flap segment 24' so that its upper, forward portion abuts the aft portion of the upper airfoil surface 14' of the wing 10' and so that the aft portion of the upper airfoil surface of the main flap segment 24' abuts the upper, forward portion of the aft flap segment 34'. In this manner the upper surfaces of the flap segments 24' and 34' form the continuous downward and rearward extension of the upper airfoil surface 14' of the wing 10'.

Figure 4:
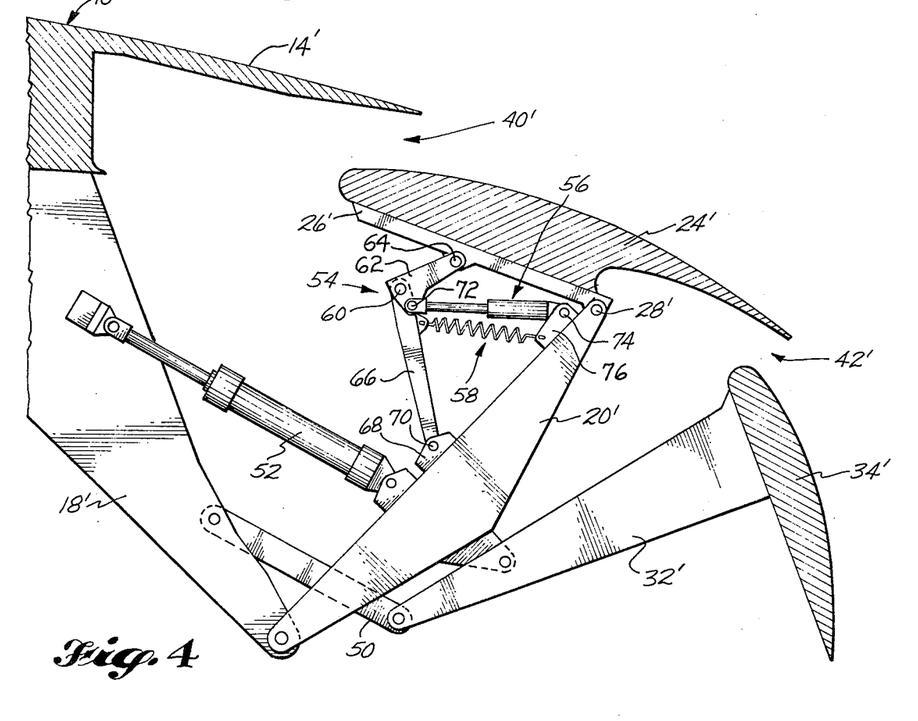
FIG. 4 is a view of the flap system of FIG. 3, showing the flap segments in the emergency, slotted configuration.

Referring to FIG. 4, as the piston arm of the actuator 56 is axially extended, the central portion of the toggle linkage 54 breaks forwardly, causing its mutual pivotal connection to move forwardly of the line between the upper and lower pivot pins 64 and 70. Because the upper and lower arms 62 and 66 are rigid, the forward motion of the central portion of the toggle linkage draws the upper and lower portions of the upper and lower arms, respectively, toward each other. As this occurs, the external flange 26' is drawn downwardly, in turn causing the forward portion of the main flap segment 24' to swing downwardly about its pivotal mounting on the main support arm 20', creating a spanwise slot 40' between the forward portion of the main flap segment 24' and the upper rearward portion of the wing 10'. Likewise, the upper rearward portion of the main flap segment 24' swings upwardly relative to the forward portion of the aft flap segment 34', creating a spanwise slot 42' between the upper, rearward portion of the main flap segment and the upper, forward portion of the aft flap segment.

Figure 5:
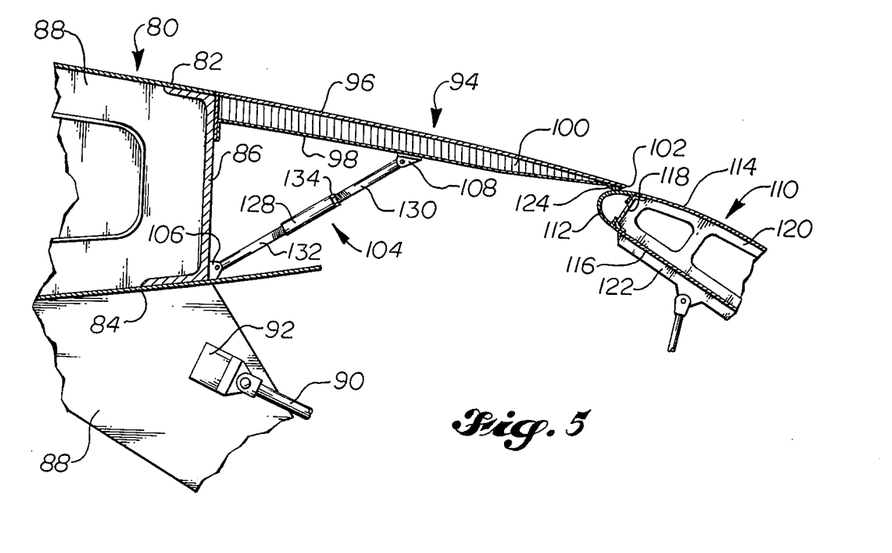
FIG. 5 is an enlarged, more detailed view of the seal attached to the trailing edge of the wing according to the present invention.

Referring now to FIG. 5, the structural details of the trailing edge of the wing, the trailing edge seal, and the forward portion of the main flap segment are shown. Although the structure shown is similar to the previous illustrations, new reference numerals are employed to distinguish these detailed views from the previous semi-schematic illustrations. The wing 80 includes an upper skin 82 and a lower skin 84 that are joined in a conventional manner to a rear spar 86 and a forwardly extending rib 88. The lower skin 84 extends rearwardly beyond the rearwardly facing surface of the rear main spar 86. The flap mounting strut 88, only the upper portion of which is shown, extends downwardly and rearwardly from the bottom surface of the wing. The arm 90 of the flap extension actuator, only a portion of which is shown, is attached to a flange 92, which is in turn affixed to the flap mounting strut 88.

A wing trailing edge panel 94 comprises an upper skin 96 and a lower skin 98 joined together by an internal honeycomb panel 100 of conventional construction. The upper skin 96 of the trailing edge panel 94 forms a rearward extension of the upper skin 82 of the wing 80, thereby defining a rearward extension of the upper airfoil surface of the wing. The rearward portion of the trailing edge panel 94 terminates in a spanwise trailing edge 102 that extends spanwise along the wing. The trailing edge panel 94 is affixed to the upper rearward portion of the rear spar 86 by conventional means such as welding and/or riveting. A stationary rigidifying link, generally designated 104, is connected between the bottom central portion of the trailing edge panel 94 and the bottom rearward portion of the rear spar 86. The lower end of the rigidifying link 104 is pivotally connected to a flange 106 that is affixed to and extends rearwardly from the lower bottom portion on the rear spar. The rigidifying link extends upwardly and rearwardly from its connection to the spar and has its other end pivotally connected to a flange 108 affixed to the central portion of the bottom surface 98 of the trailing edge panel 94. The rigidifying link 104 is positioned so that it does not interfere with the main flap segment 110 when it is in a retracted position.

As shown in FIG. 5, the main flap segment is in a fully extended position. The main flap segment is of conventional construction including a leading edge skin 112, an upper skin 114, a lower skin 116, a forward spar 118 and a rib 120. An external attachment flange 122 is affixed to the lower side of the main flap segment 110 to provide external structure for attaching the toggle linkage (not shown) and the main support arm (not shown) as described in relation to the previous embodiments.

Figure 6:
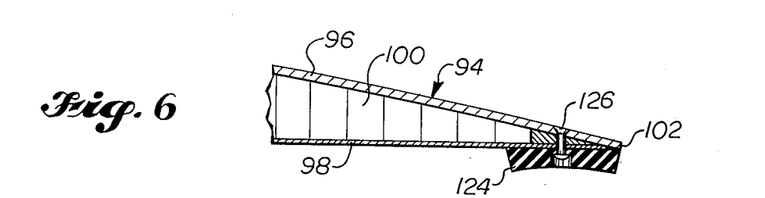
FIG. 6 is a further enlarged view of the trailing edge and seal structure illustrated in FIG. 5.

As with the other illustrations, the detailed views of FIGS. 5 and 6 show only a cross-section of the wing and trailing edge flap system. It is to be understood that the flap segments have a spanwise dimension as well as the illustrated chordwise dimension. Likewise, the wing has a spanwise dimension. The spanwise extent of the trailing edge panel 94 is substantially equal to the spanwise dimension of the main flap segment, which of course can be equal to, but is normally less than the full span of the wing 80. Several rigidifying links 104 are employed along the span of the trailing edge panel to fix the position of the panel in relation to the wing 80 and the flap segment 110.

As explained in conjunction with the previous embodiments, the flap structure of the present invention is constructed so that the flap segments can normally be extended to the STOL position to form a smooth downward and rearward extension of the upper airfoil surface of the wing. When in the extended STOL position, it is necessary that no slot be allowed to form between the upper surface of the main flap segment and the trailing edge of the wing. Likewise, it is equally important in the preferred embodiments described herein that no slot be allowed to form between the trailing edge of the main flap segment and the upper surface of the aft flap segment. When the exhaust stream from an upper surface blowing engine is traveling over the upper airfoil surface of the wing and when the flaps are in the extended STOL position, the trailing edge panel 94 tends to be lifted upwardly so as to cause a separation between the trailing edge 102 of the trailing edge panel and the upper surface of the main flap segment. If this occurs, the exhaust stream will detach from the upper airfoil surface, substantially destroying the lift component otherwise derived from the exhaust stream.

In accordance with the present invention, this problem is alleviated by providing a spanwise seal, generally designated 124 in FIG. 5 and shown in enlarged detail in FIG. 6, along the lower surface of the trailing edge panel adjacent and forwardly of the trailing edge of the panel. The seal 124 has an arcuate lower surface which contacts the upper surface of the flap segment in all extended positions when the main segment is in the STOL configuration (as opposed to the slotted configuration). The upper surface of the seal abuts the lower surface 98 of the trailing edge panel 94 and is affixed to the trailing edge panel by suitable fasteners, such as rivet 126. The seal can be composed of a suitable high temperature resistant, lubricant impregnated, polymeric composition, such as "Rulon LD" commercially sold by the Dixon Corporation, Bristol, Rhode Island.

The seal 124 is caused to bear upon the upper surface of the flap segment with a predetermined force. As related above, the curvature of the upper airfoil surface of the flap segment and the flap support structure are designed to be extended from a retracted position to a fully extended STOL position without repositioning the main flap segment. During extension, the upper surface of the flap segment line of contact between the seal remains at a substantially constant location relative to the wing structure. Thus, the predetermined force with which the seal bears upon the upper surface of the flap segment is constant during extension and retraction of the flap segment. This predetermined force is set by adjusting the length of adjustable link 104 to thereby vary the vertical position of the trailing edge panel 94 relative to the flap segment. Although the trailing edge panel 94 is a substantially rigid structure, it is designed so that some flexure is available. The adjustable connecting link 104 comprises a turnbuckle assembly having a rotatable central tube 128 that is threadably engaged onto upper and lower link segments 130 and 132. The threads are formed in opposite directions so that turning the central tube 128 in a first direction will shorten the effective length of the adjustable link 104 and turning the tube 128 in the opposite direction will increase the effective length of the adjustable link 104. A lock nut 134 is threaded onto one upper link segment and can be tightened against the central tube 128 to lock the latter in place, thereby fixing the length of the adjustable link 104. By appropriately adjusting the length of the adjustable link 104, the trailing edge 102 of the trailing edge panel 94 can be moved slightly upwardly or downwardly. As the adjustable link 104 is shortened, the trailing edge 102 is brought toward the upper surface of the flap segment 110 causing the seal to bear on the upper surface of the flap segment with a given force. If the length of the adjustable link 104 is increased, the force with which the seal 124 bears on the upper surface of the segment 110 can be reduced. The force with which the seal is caused to bear upon the upper surface need only be slightly greater than the lifting force which tends to raise the panel 94 away from the flap segment when the flap system is operating in the STOL mode.

Figure 7:
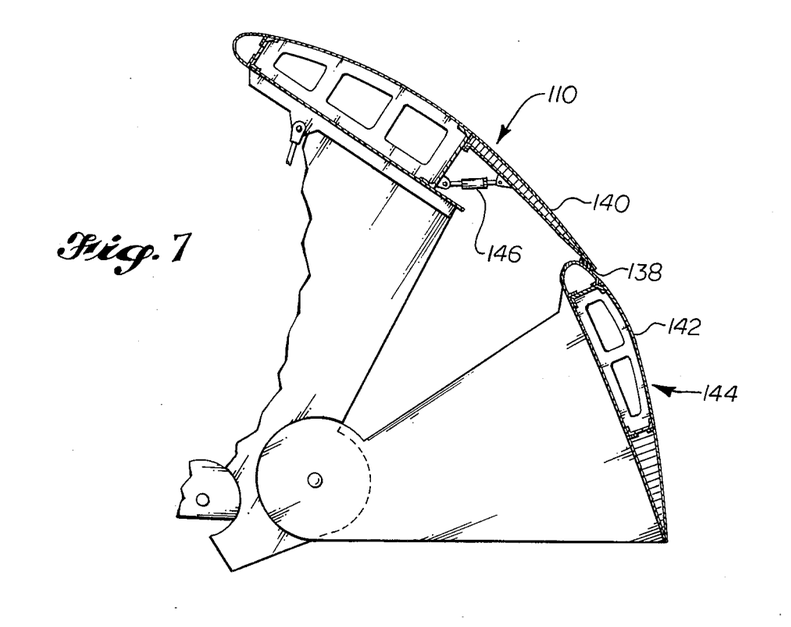
FIG. 7 is an enlarged detailed view of the seal attached to the trailing edge of the main flap segment according to the present invention.

As illustrated in FIG. 7, a similar seal 138 can be employed on the trailing edge panel 140 affixed to the rear portion of the main flap segment 110 to form a seal between the trailing edge of the main flap segment and the upper surface 142 of the aft flap segment 144. The trailing edge panel 140, including the seal 138 and an adjustable link 146, can be affixed to the main flap segment in the same manner as the trailing edge panel 94 is affixed to the wing 80.

Although the preferred embodiment of the invention is somewhat more complex than the first described embodiment, sufficient advantages are derived from the latter embodiment to warrant the additional mechanism. For example a mechanical advantage can be provided by the toggle linkage allowing the use of smaller actuators. In addition a failsafe mechanism to hold the main segment in its first position can be provided via the extended biasing spring. Otherwise, the operation and effectiveness of the preferred embodiment of the invention is the same as the first described embodiment. One of ordinary skill in the art after reading the foregoing specification will be able to effect various changes, substitutions of equivalents, and other alterations without departing from the original concepts disclosed herein. It is therefore intended that the present invention be limited only by the definition contained in the appended claims.

What is claimed is:

1. An aerodynamic lift enhancing apparatus comprising:
   a wing having a span and an upper airfoil surface,
   a first trailing edge flap having a span, a forward portion, an aft portion, and an upper airfoil surface,
   a first support means associated with said wing for supporting said first flap for fore and aft swinging movement relative to said wing between a retracted position and a plurality of extended positions, said first flap in said extended positions being effective to increase the camber and chord of said wing, said first flap in said extended positions having its forward portion located rearwardly from its retracted position and having its forward portion located below the aft portion of said upper airfoil surface of said wing, mounting means for connecting said first flap on said first support means for swinging movement about a generally spanwise axis between a first position and a second position, said first flap being movable to said second position only when said first flap is in said plurality of extended positions, said first flap when in said retracted position being only in said first position, the upper airfoil surface of said first flap being so shaped relative to the aft portion of said upper airfoil surface of said wing and being so oriented relative to said first support means as to form, when in said first position and when normally moved from said retracted position to said plurality of extended positions, a smooth, downward and rearward, continuous extension of the upper airfoil surface of said wing, said first flap when moved to said second position being oriented such that the forward portion of the upper airfoil surface of said first flap is spaced downwardly from the aft portion of the upper airfoil surface of said wing to form a spanwise slot between the aft portion of said wing and the upper forward portion of said first flap, and actuating means for moving said first flap between said first and second positions.

2. The apparatus of claim 1 wherein said mounting means connects said first flap to said first support means for pivotal movement about an axis that is oriented spanwise relative to said wing.

3. The apparatus of claim 1 further comprising:
a second trailing edge flap having a forward portion, a rearward portion, and an upper airfoil surface,
second support means associated with said first support means for mounting said second flap for fore and aft swinging movement relative to said first flap between a retracted position and a plurality of extended positions, said second flap in said extended positions cooperating with said first flap to further increase the camber and chord of said wing, said second flap in said extended position having its forward portion located rearwardly from its retracted position and having its forward portion located below the aft portion of the upper airfoil surface of said first flap, the upper airfoil surface of said second flap being so shaped relative to the aft portion of the upper airfoil surface of said first flap and being so oriented relative to said second support means as to form, when said first flap is in said first position and when both flaps are moved to said plurality of extended positions, a smooth downward and rearward, continuous extension of the upper airfoil surface of said first flap, said first flap when moved to said second position being oriented such that the aft portion of the upper airfoil surface of said first flap is spaced upwardly from the forward portion of the upper airfoil surface of said second flap so as to form a spanwise slot between the aft portion of said first flap and the upper forward portion of said second flap.

4. The apparatus of claim 3 wherein the aft portion of said wing defines a rearwardly opening recess and wherein the aft portion of said first flap defines a rearwardly opening recess, said first flap in said retracted position being at least partially nested within the recess in said wing, said second flap in said retracted position being at least partially nested in the recess in said first flap.

5. An aerodynamic lift enhancing apparatus comprising:
a wing having a span and an upper airfoil surface, the aft portion of said wing defining a rearwardly opening recess,
a first trailing edge flap having a span, a forward portion, an aft portion, and an upper airfoil surface,
a first support means associated with said wing for supporting said first flap for fore and aft swinging movement relative to said wing between a retracted position and a plurality of extended positions, said first flap in said retracted position being at least partially nested within said recess in said wing, said first flap in said extended positions being effective to increase the camber and chord of said wing, said first flap in said extended positions having its forward portion located rearwardly from its retracted position and having its forward portion located below the aft portion of said upper airfoil surface of said wing,
mounting means for connecting said first flap on said first support means for swinging movement about a generally spanwise axis between a first position and a second position when said first flap is in at least some of said plurality of extended positions, said first flap when in said retracted position also being in said first position, the upper airfoil surface of said first flap being so shaped relative to the aft portion of said upper airfoil surface of said wing and being so oriented relative to said first support means as to form, when in said first position and when moved to said plurality of extended positions, a smooth, downward and rearward, continuous extension of the upper airfoil surface of said wing, said first flap when moved to said second position being oriented such that the forward portion of the upper airfoil surface of said first flap is spaced downwardly from the aft portion of the upper airfoil surface of said wing to form a spanwise slot between the aft portion of said wing and the upper forward portion of said first flap, and
actuating means for moving said first flap between said first and second positions,
said mounting means being so associated with said first flap to mount said first flap on said first support means for swinging movement independently of the position of said first support means, said actuating means being so associated with said first flap to move said first flap between said first and second positions independently of the position of said first support means.

6. An aerodynamic lift enhancing apparatus comprising:
a wing having a span and an upper airfoil surface, the aft portion of said wing defining a rearwardly opening recess,
a first trailing edge flap segment having a span, a forward portion, an aft portion, and an upper airfoil surface,
a first support means associated with said wing for supporting said first flap segment for fore and aft swinging movement relative to said wing between a retracted position and a plurality of extended positions, said first flap segment in said retracted position being at least partially nested within said recess in said wing, said first flap segment in said extended positions being effective to increase the camber and chord of said wing, said first flap segment in said extended positions having its forward portion located rearwardly from its retracted position and having its forward portion located below the aft portion of said upper airfoil surface of said wing, mounting means for connecting said first flap segment on said first support means for swinging movement about a generally spanwise axis between a first position and a second position when said first flap segment is in at least some of said plurality of extended positions, said first flap segment when in said retracted position also being in said first position, the upper airfoil surface of said first flap segment being so shaped relative to the aft portion of said upper airfoil surface of said wing and being so oriented relative to said first support means as to form, when in said first position and when moved to said plurality of extended positions, a smooth, downward and rearward continuous, extension of the upper airfoil surface of said wing, said first flap segment when moved to said second position being oriented such that the forward portion of the upper airfoil surface of said first flap segment is spaced downwardly from the aft portion of the upper airfoil surface of said wing to form a spanwise slot between the aft portion of said wing and the upper forward portion of said first flap segment, actuating means for moving said first flap segment between said first and second positions, said actuating means for moving said first flap segment including a toggle linkage having first and second arms pivotally connected to each other at mutually adjacent ends thereof, the mutually opposite ends of said arms being pivotally connected respectively to said first flap segment and to the first support means, and means for moving the mutually adjacent ends of said arms toward and away from a line between the pivotal connections of said arms to said first flap segment and to said support means to thereby swing said first flap segment between said first and second position.

7. The apparatus of claim 6 wherein:

said first flap segment is mounted on said first support means for pivotal movement about said generally spanwise axis, and wherein the pivotal connection of one of said arms to said first flap segment is positioned forwardly of the pivotal connection between said first support means and said first flap segment.

8. The apparatus of claim 7 wherein said means for moving the mutually adjacent ends of said arms comprises:

spring means for biasing said mutually adjacent ends of said arms toward said line, and an extensible actuating means for moving said mutually adjacent ends of said arms away from said line.

9. An aerodynamic lift enhancing apparatus comprising:

a wing having a span and an upper airfoil surface, the aft portion of said wing defining a rearwardly opening recess, said wing further having a trailing edge panel, said trailing edge panel having a lower portion forming the upper wall of said recess in said wing and an upper airfoil surface forming a substantially fixed rearwardly extending portion of the upper airfoil surface of said wing, said trailing edge panel having a trailing edge, a first trailing edge flap segment having a span, a forward portion, an aft portion, and an upper airfoil surface, a first support means associated with said wing for supporting said first flap segment for fore and aft swinging movement relative to said wing between a retracted position and a plurality of extended positions, said first flap segment in said retracted position being at least partially nested within said recess in said wing, said first flap segment in said extended positions being effective to increase the camber and chord of said wing, said first flap segment in said extended positions having its forward portion located rearwardly from its retracted position and having its forward portion located below the aft portion of said upper airfoil surface of said wing, mounting means for connecting said first flap segment on said first support means for swinging movement about a generally spanwise axis between a first position and a second position when said first flap segment is in at least some of said plurality of extended positions, said first flap segment when in said retracted position also being in said first position, the upper airfoil surface of said first flap segment being so shaped relative to the aft portion of said upper airfoil surface of said wing and being so oriented relative to said first support means as to form, when in said first position and when moved to said plurality of extended positions, a smooth, downward and rearward, continuous extension of the upper airfoil surface of said wing, said first flap segment when moved to said second position being oriented such that the forward portion of the upper airfoil surface of said first flap segment is spaced downwardly from the aft portion of the upper airfoil surface of said wing to form a spanwise slot between the aft portion of said wing and the upper forward portion of said first flap segment, actuating means for moving said first flap segment between said first and second positions, seal means affixed to the lower portion of said trailing edge panel forwardly of and adjacent the trailing edge of said panel, said seal means contacting the upper surface of said flap segment when said flap segment is in said first position to form a sliding seal between said trailing edge panel and said flap segment, and connecting means attached to said wing and to said trailing edge panel for flexing said trailing edge panel upwardly and downwardly to adjust the upward and downward position of said trailing edge relative to the upper surface of said flap segment, said panel being capable of flexing to vary, in conjunction with said connecting means, the force with which said seal means bears against the upper surface of said flap segment.

10. An aerodynamic lift enhancing apparatus comprising:

a wing having a span and an upper airfoil surface, the aft portion of said wing defining a rearwardly opening recess, said wing further including a first trailing edge panel, said first panel having a lower portion forming the upper wall of said recess in said wing and having an upper airfoil surface forming a substantially fixed rearwardly extending portion of the upper airfoil surface of said wing, said first panel having a trailing edge, a first trailing edge flap segment having a span, a forward portion, an aft portion, and an upper airfoil surface, the aft portion of said first trailing edge flap segment defining a rearwardly opening recess, including a second trailing edge panel, said second panel having a lower portion forming the upper wall of said recess in said first flap segment and having an upper airfoil surface forming a rearwardly extending portion of the upper airfoil surface of said first flap segment, said second panel having a trailing edge, a first support means associated with said wing for supporting said first flap segment for fore and aft swinging movement relative to said wing between a retracted position and a plurality of extended position, said first flap segment in said retracted position being at least partially nested within said recess in said wing, said first flap segment in said extended positions being effective to increase the camber and chord of said wing, said first flap segment in said extended positions having its forward portion located rearwardly from its retracted position and having its forward portion located below the aft portion of said upper airfoil surface of said wing, mounting means for connecting said first flap segment on said first support means for swinging movement about a generally spanwise axis between a first position and a second position when said first flap segment is in at least some of said plurality of extended positions, said first flap segment when in said retracted position also being in said first position, the upper airfoil surface of said first flap segment being so shaped relative to the aft portion of said upper airfoil surface of said wing and being so oriented relative to said first support means as to form, when in said first position and when moved to said plurality of extended positions, a smooth, downward and rearward, continuous extension of the upper airfoil surface of said wing, said first flap segment when moved to said second position being oriented such that the forward portion of the upper airfoil surface of said first flap segment is spaced downwardly from the aft portion of the upper airfoil surface of said wing to form a spanwise slot between the aft portion of said wing and the upper forward portion of said first flap segment, actuating means for moving said first flap segment between said first and second positions, a second trailing edge flap segment having a forward portion, a rearward portion, and an upper airfoil surface, second support means associated with said first support means for mounting said second flap segment for fore and aft swinging movement relative to said first flap segment between a retracted position and a plurality of extending positions, said second flap segment in said extended positions cooperating with said first flap segment to further increase the camber and chord of said wing, said second flap segment when in said retracted position being at least partially nested in the recess in said first flap segment, said second flap segment in said extended position having its forward portion located rearwardly from its retracted position and having its forward portion located below the aft portion of the upper airfoil surface of said first flap segment, the upper airfoil surface of said second flap segment being so shaped relative to the aft portion of the upper airfoil surface of said first flap segment and being so oriented relative to said second support means as to form, when said first flap segment is in said first position and when both flap segments are moved to said plurality of extended positions, a smooth, downward and rearward, continuous extension of the upper airfoil surface of said first flap segment, said first flap segment when moved to said second position being oriented such that the aft portion of the upper airfoil surface of said first flap segment is spaced upwardly from the forward portion of the upper airfoil surface of said second flap segment so as to form a spanwise slot between the aft portion of said first flap segment and the upper forward portion of said second flap segment, first seal means affixed to the lower portion of said first panel forwardly of and adjacent the trailing edge of said first panel, said first seal means contacting the upper surface of said first flap segment when said first flap segment is in said first position to form a sliding seal between said first panel and said first flap segment, and second seal means affixed to the lower portion of said second panel forwardly of and adjacent the trailing edge of said second panel, said second seal means contacting the upper surface of said second flap segment when said first flap segment is in said first position to form a sliding seal between said second trailing edge panel and said second flap segment.

11. The apparatus of claim 10 further comprising:

first connecting means attached to said wing and to said first panel for flexing said first panel upwardly and downwardly to adjust the upward and downward position of the trailing edge of said first panel relative to the upper surface of said first flap segment, said first panel being capable of flexing to vary, in conjunction with said connecting means, the force with which said first seal means bears against the upper surface of said first flap segment, and second connecting means attached to said first flap segment and to said second trailing edge panel for flexing said second panel upwardly and downwardly to adjust the upward and downward position of the trailing edge of said second panel relative to the upper surface of said second flap segment, said second panel being capable of flexing to vary, in conjunction with said connecting means, the force with which said second seal means bears against the upper surface of said second flap segment.

12. An aerodynamic lift enhancing apparatus comprising:

a wing having a span, an upper airfoil surface and a trailing edge panel, said trailing edge panel having a lower portion forming the upper wall of a recess in the aft portion of said wing and having an upper surface forming a substantially fixed rearward extension of the upper airfoil surface of said wing, said trailing edge panel having a trailing edge, a first trailing edge flap segment having a span, a forward portion, an aft portion, and an upper airfoil surface, a first support means associated with said wing for supporting said first flap segment for fore and aft swinging movement relative to said wing between a retracted position and a plurality of extended positions, said first flap segment in said extended positions being effective to increase the camber and chord of said wing, said first flap segment in said extended positions having its forward portion located rearwardly from its retracted position and having its forward portion located below the aft portion of said upper airfoil surface of said wing, mounting means for connecting said first flap segment on said first support means for swinging movement about a generally spanwise axis between a first position and a second position, said first flap segment being movable to said second position only when said first flap segment is in said plurality of extended positions, said first flap segment when in said retracted position being only in said first position, the upper airfoil surface of said first flap segment being so shaped relative to the aft portion of said upper airfoil surface of said wing and being so oriented relative to said first support means as to form, when in said first position and when normally moved from said retracted position to said plurality of extended positions, a smooth, downward and rearward, continuous extension of the upper airfoil surface of said position said first flap segment when moved to said second positioon being oriented such that the forward portion of the upper airfoil surface of said first flap segment is spaced downwardly from the trailing edge of said trailing edge panel to form a spanwise slot between the aft portion of said wing and the upper, forward portion of said first flap segment, actuating means for moving said first flap segment between said first and second positions, and seal means affixed to the lower portion of said trailing edge panel forwardly of and adjacent the trailing edge of said panel, said seal means contacting the upper surface of said flap segment when said flap segment is in said first position to form a sliding seal between said trailing edge panel and said flap segment.

\* \* \* \* \*

UNITED STATES PATENT AND TRADEMARK OFFICE
CERTIFICATE OF CORRECTION

PATENT NO. : 3,987,983

DATED : October 26, 1976

INVENTOR(S) : James B. Cole

It is certified that error appears in the above—identified patent and that said Letters Patent are hereby corrected as shown below:

Column 15, lines 17-18: "position," should read --positions,--.

Column 18, line 4: delete "position" and insert therefor --wing,--.

Column 18, line 5: delete "positioon" and insert therefor --position--.

Signed and Sealed this

Twenty-fifth Day of January 1977

[SEAL]

Attest:

RUTH C. MASON
Attesting Officer

C. MARSHALL DANN
Commissioner of Patents and Trademarks